(12) United States Patent
Little et al.

(10) Patent No.: US 6,973,640 B2
(45) Date of Patent: Dec. 6, 2005

(54) SYSTEM AND METHOD FOR COMPUTER CODE GENERATION

(75) Inventors: Todd Little, Palatine, IL (US); Loren Konkus, Novi, MI (US); Gilles Lavalou, Grasse (FR); Timo Metsaportti, Espoo (FI)

(73) Assignee: BEA Systems, Inc., San Jose, CA (US)

(*) Notice: Subject to any disclaimer, the term of this patent is extended or adjusted under 35 U.S.C. 154(b) by 675 days.

(21) Appl. No.: 09/970,741

(22) Filed: Oct. 4, 2001

(65) Prior Publication Data

US 2002/0133812 A1 Sep. 19, 2002

Related U.S. Application Data

(60) Provisional application No. 60/238,559, filed on Oct. 4, 2000, and provisional application No. 60/238,561, filed on Oct. 4, 2000.

(51) Int. Cl.[7] ............................................... G06F 9/44
(52) U.S. Cl. ..................... 717/106; 717/143; 717/117
(58) Field of Search ........................... 717/104–109, 717/117, 143

(56) References Cited

U.S. PATENT DOCUMENTS 6,212,672 B1 * 4/2001 Keller et al. ............... 717/104

OTHER PUBLICATIONS

Free Software Foundation, "GNAT Compiler Components," 1998, pp. 8, 15 and 16; http://www.cs.nyu.edu/courses/spring00/G22.2130–001/par.html.*

U.S. Appl. No. 09/970,917, filed Oct. 4, 2001, Little et al.

* cited by examiner

Primary Examiner—Ohameli C. Das
Assistant Examiner—Lawrence Shrader
(74) Attorney, Agent, or Firm—Fliesler Meyer, LLP

(57) ABSTRACT

The invention provides a system and method for computer code generation that can be used to generate code and configuration files from any data source. In accordance with one embodiment of the invention a Generator Framework provides a common set of standards and APIs through which designs may be input. The purpose of the Generator Framework is to unify the code generation techniques implemented in products such as the Builder products from BEA Systems, Inc., by introducing sufficient abstraction levels. Built-in rules are introduced in the Generator Framework, and a data navigation layer isolates the Generator Framework from the data sources used. Filters can be added to the framework to transform data. Notifiers are used by the Generator Framework to notify external components about the generation process.

27 Claims, 5 Drawing Sheets

SYSTEM AND METHOD FOR COMPUTER CODE GENERATION

CLAIM OF PRIORITY

This application claims priority from provisional application "SYSTEM AND METHOD FOR COMPUTER CODE GENERATION", Application No. 60/238,559, filed Oct. 4, 2000, and "SYSTEM FOR SOFTWARE APPLICATION DEVELOPMENT AND MODELING," Application No. 60/238,561, filed Oct. 4, 2000, and is related to "SYSTEM FOR SOFTWARE APPLICATION DEVELOPMENT AND MODELING," application No. 09/970,917, Inventors Todd Little and Loren Konkus, filed Oct. 4, 2001, all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to computer software development and specifically to a system and a method for generating computer code for software applications.

BACKGROUND

The increasingly important field of software development brings with it the ever more common question—who can we get to actually do the software coding? Software developers or coders are in high demand, and their skills demand premium salaries. As such the software generation or development process is a major factor to consider for any company that relies on or uses software for it's day-to-day business needs. This issue is even more relevant to those companies who support the software development process-companies such as BEA Systems, Inc, IBM Corporation, and Microsoft Corporation who develop software development products, suites and tools. In order to maximize the benefits of their products to their end customers, these companies must develop tools that allow a software developer to minimize the amount of time necessary to finish a particular software project, while at the same time maximizing the options available to the developer to create a quality product. Some tools are also particularly geared to helping junior or beginning developers, who may not be as experienced, to successfully compete against more established and skilled software architects.

Given the importance of software development to the global industry, and the demands that it should be relatively painless, easy to work with, and that it make optimal use of time and resources, it seems natural to want to develop a software generation tool or system, that automatically generates software code in accordance with some preset or preordained wishes of a developer. This allows the software architect or developer to concentrate on the "big picture", and to envisage the functioning of the software application as a whole, without undue regard to the intricacies of code development.

To this end, many tools allow the architect to develop a model or plan of the desired software application and to use this plan as a blueprint for subsequent software development. Similar to the way in which an architect designs blueprints for a building, software designers also design blueprints for their complex software applications. And just as a building architect likes to be able to test those blueprints for structural soundness, using for example a modeling or analysis system to test each aspect of the design, software architects also like to test their software blueprints for reliability, scalability, optimal use of resources, and good software design. As the complexity of a particular project increases, so too does the need for a reliable, accurate model. The software industry has developed several modeling techniques to address this need, one of which is the Unified Modeling Language (UML), a nonproprietary language defined in the Object Management Group Unified Modeling Language Specification, hereby incorporated by reference. UML provides software architects with a standardized language for specifying, constructing, visualizing and documenting the artifacts of a complex software system. The UML specification is a successor to three earlier object-oriented methods, Booch, Object Modeling Technique (OMT), and Object Oriented Software Engineering (OOSE), and includes additional expressiveness to handle more complex modeling problems, not readily handled by prior techniques.

Some of the features inherent in UML are: Formal definition of a common object analysis and design (OA&D) metamodel to represent the semantic of OA&D models, including static, behavioral, usage and architectural models, Interface Definition Language (IDL) Specifications for mechanisms for model interchange between OA&D tools, which includes a set of IDL interfaces that support dynamic construction and traversal of a user model; and, easily readable notation for representing OA&D models, most commonly a graphic syntax for consistently expressing UML semantics. As such the UML is more correctly considered a visual modeling language rather than a visual programming language. Because of its open standard and widespread industry use it serves to lower the cost of training and retooling when changing between projects and organizations, and provides opportunity for new integration between tools, processes and domains.

Some tools have attempted to combine the design aspects of a UML-based design system, with code generation functionality, to better assist the software developer in code design and generation. An example of this type of tool is the Builder range of products from BEA Systems, Inc, San Jose, Calif., that can be used to build applications, primarily in C or C++, and primarily for the Tuxedo server product, although other types of application can be built, and in other languages. A problem with most of these types of product can that they tend to proprietary in nature, or geared specifically toward code generation for a particular species of code type or server. If the developer or architect must work across platforms on a particular project they often need to learn the specific code generation techniques for those platforms. This in turn consumes development time, and adds to both the learning and maintenance time required to manage the various platform tools. The overall situation ends up being not much more useful than if no tools were used.

It would be more useful if there existed a uniform code development or generation system, that was generic enough to be used with a wide variety of platforms and technologies, yet could be made specific enough in those cases in which a detailed integration with the product was needed.

SUMMARY

The invention tackles the demand for a software development and code generation environment that combines the ability to act generically across a wide variety of platforms, yet can be customized for each individual product as required. Roughly described, the invention provides a framework, that supports a system and a method for computer code generation, which can in turn be used to generate code and configuration files from any data source. In accordance with one embodiment of the invention a Builder Generator Framework (or simply a Generator Framework) provides a common set of standards and application programming interfaces (APIs) through which designs may be input. The purpose of the Generator Framework is to unify the code generation techniques implemented in products such as the Builder products from BEA Systems, Inc., by introducing sufficient abstraction levels. Built-in rules are introduced or plugged-in into the generator framework, and a data navigation layer or interface isolates the generator framework from the data sources (and the underlying software products, applications, development suites or servers) used. Filters can be added to the framework to transform data, while notifiers are used by the generator framework to notify external components about the generation process.

DETAILED DESCRIPTION

Figure 1:
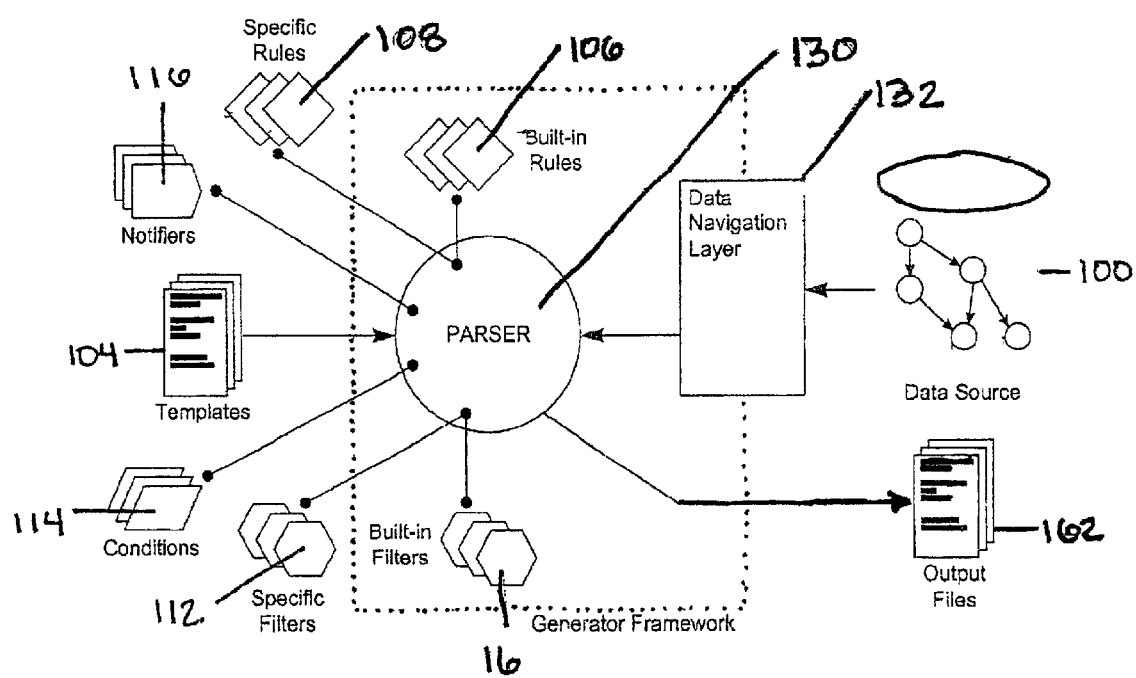
FIG. 1 shows a Generator Framework in accordance with an embodiment of the invention.

Roughly described, the invention provides a system and method for computer code generation that can be used to generate code and configuration files from any data source. As referred to herein, a Generator Framework is used to unify the code generation techniques implemented in products such as the Builder products from BEA Systems, Inc., by introducing sufficient abstraction levels. When used in the context of the Builder products, the framework may be referred to as the Builder Generator Framework, although it will be evident to one skilled in the art that the systems and techniques described herein have application beyond the products described, which are listed for illustrative purposes and to show the operation of the invention in an everyday setting.

Introduction

The following terms are used herein, and have the appropriate meanings and equivalents known to one skilled in the art:

Design Pattern—A Design Pattern names and identifies a common object oriented design structure.

IDL—Interface Definition Language, as defined by the Common Object Request Broker Architecture and Specification.

Interface Repository—An interface repository (or simple repository) contains the definitions of the interfaces that determine client/server contracts.

The Generator Framework provides a common set of standards and application programming interfaces (APIs) to generate code and configuration files from any data source. A primary goal in developing the Generator Framework is to unify the code generation techniques implemented in the Builder family of products, by introducing sufficient abstraction levels. Built-in (or generic) rules are introduced in the generator framework. A data navigation layer isolates the generator framework from the data sources used. Filters can be added to the framework to transform data. Notifiers are used by the generator framework to notify external components about the generation process.

The Generator Framework is intended to be used in development products such as those produced by BEA Systems, Inc. which includes their Builder family of products. BEA Builder is designed to enable companies to leverage the development skills of their existing programming staff, while substantially reducing the time and costs associated with implementing new applications, such applications being then used primarily for the BEA Tuxedo platform. BEA Builder is a suite of five products which address the key aspects of client-side and server-side application development. These include:

BEA Active Expert—A tool that allows the use of popular Windows development tools to create BEA TUXEDO client applications.

BEA C++ Expert—A tool that assists the programmer in writing BEA TUXEDO servers and clients using C++.

BEA Contract Repository—A central repository for the storage of interface information for server-side BEA TUXEDO application components.

BEA Rose Expert 2.0—A plug-in to the Rational Rose development tool that allows the application designer to leverage the Rose object design environment to build BEA TUXEDO servers and clients using C++.

BEA Configuration Expert 2.0—A tool to quickly and simply generate BEA TUXEDO configuration files without having to know the specific configuration file formats.

This robust suite of products helps enable rapid development of BEA TUXEDO applications and encompasses the full set of development tasks, allowing the developer to continue to use their tool of choice, while filling in the gaps, augmenting standard development tools to provide the essential capabilities needed to do both client and server side business application development. The Generation Framework architecture is also intended to be flexible enough to be reused in other BEA products, such as BEA Repository, but it will be evident to one skilled in the art that the architecture has applications beyond theses examples. Although the Generator Framework architecture does not decide upon or define the implementation language used, code examples given herein are in JAVA. These examples can easily be transposed to C or C++.

Within this document, the following conventions are used within this document when displaying UML diagrams:

Interfaces are in Italic

Abstract classes are in Bold Italic

Concrete classes are in Bold.

Generator Architecture

The Generator Framework architecture may be used and customized in several Builder products, such as the Active Expert, C++ Expert, Rose Expert, Configuration Expert and Ice Crystal products. This document describes the architecture of a common Generator Framework, in which the abstraction levels are raised to integrate different tools and types of generation (C++, UBBconfig files, etc.); and different data sources (Contract Repository, Configuration Repository, etc.)

Figure 5:
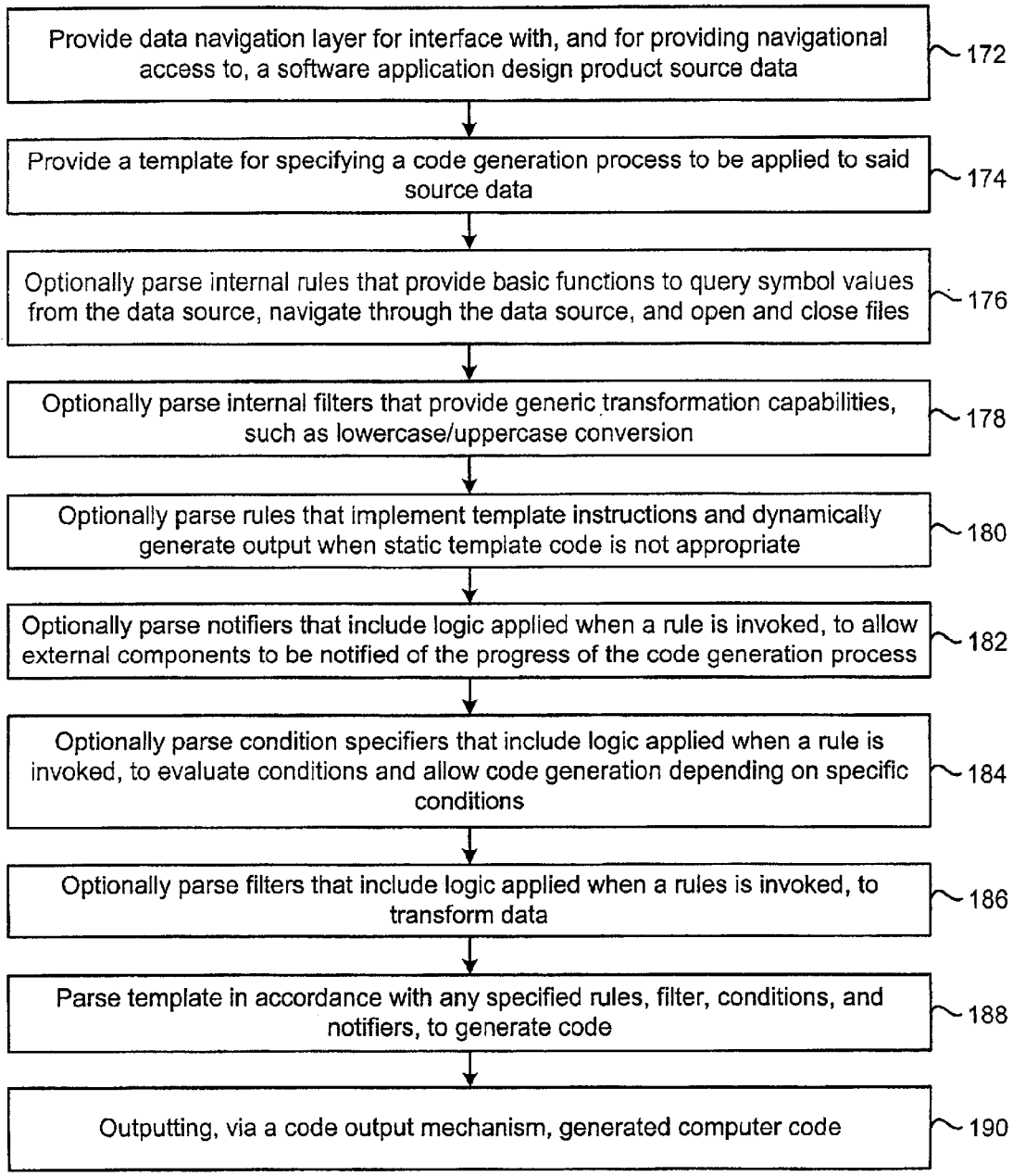
FIG. 5 is a flowchart of a code generation process in accordance with an embodiment of the invention.

FIG. 1 shows the Generator Framework architecture, while FIG. 5 shows a flowchart of a code generation process in accordance with an embodiment of the invention. As shown in FIG. 1, the arrows describe the data flow and the lines ending with dots describe a plug-in relationship. Rules, Filters, Conditions and Notifiers are internal or external pieces of code that plug into the framework. In accordance with one embodiment The Generator Framework architecture is composed of the following elements (although not all elements may be present in each embodiment):

The Data Source 100 is the place where the data used for the generation comes from. It is usually considered as a repository (e.g. Builder Contract Repository, CORBA Interface Repository, etc . . . ). The data source may be stored on any temporary, permanent or semipermanent storage device, hereinafter referred to simply as a storage device. Such storage devices may include memory devices, magnetic devices, hard (fixed) disks, and equivalent storage mechanisms. When the data source is taken directly from a software product or application it may be read directly or in real-time from that application and not e stored as any discrete file or record.

The Output Files 102 are the result of the generation. The output files may be output, written to, or stored on any temporary, permanent or semipermanent storage device, hereinafter referred to simply as a storage device, such as described above. When the output files are intended to be sent directly to another software application they may be sent directly or in real-time to that application and not e stored as any discrete file or record.

Templates 104 are text files containing both instructions to drive the generation process and pieces of static code that need to be generated.

Rules can be internal (106) or external (108) to the framework, and are pieces of logic that implement template instructions. Rules are used to generate output dynamically when static template code is not appropriate.

Filters can be internal (110) or external (112) pieces of logic invoked from rules and used to transform data.

Conditions 114 are external pieces of logic invoked from rules used to evaluate conditions. Conditions are used to generate code depending on some specific conditions.

Notifiers 116 are external pieces of logic used when a rule is invoked. This allows external components to be notified of the progress of the generation process.

The Generator Framework is composed of a set of classes providing generation abstractions, using a data source as input, template files and external specific rules to drive the generation process against the data sources, and producing one or many output files. The Generator Framework itself is composed of the following elements:

A Parser 130 parses template files and invokes appropriate rules (built-in or specific). The Parser is also the place where all the plug-ins are registered: Rules, Filters, Conditions and Notifiers.

A Data Navigation Layer 132 acts as an abstraction to the data source, by providing navigational capabilities inside the data source. This layer implements the Facade design pattern, and exposes only the navigation primitives, not the details of the data source. This and other design patterns are described in Design Patterns, Gamma et al. Addison Wesley, hereby incorporated by reference.

Built-in Rules 106 provide basic functions to query symbol values from the data source, navigate through the data source, and open and close files.

Built-in Filters 110 provide generic transformation capabilities, such as lowercase/uppercase conversion.

Data Navigation Layer 132

Figure 2:
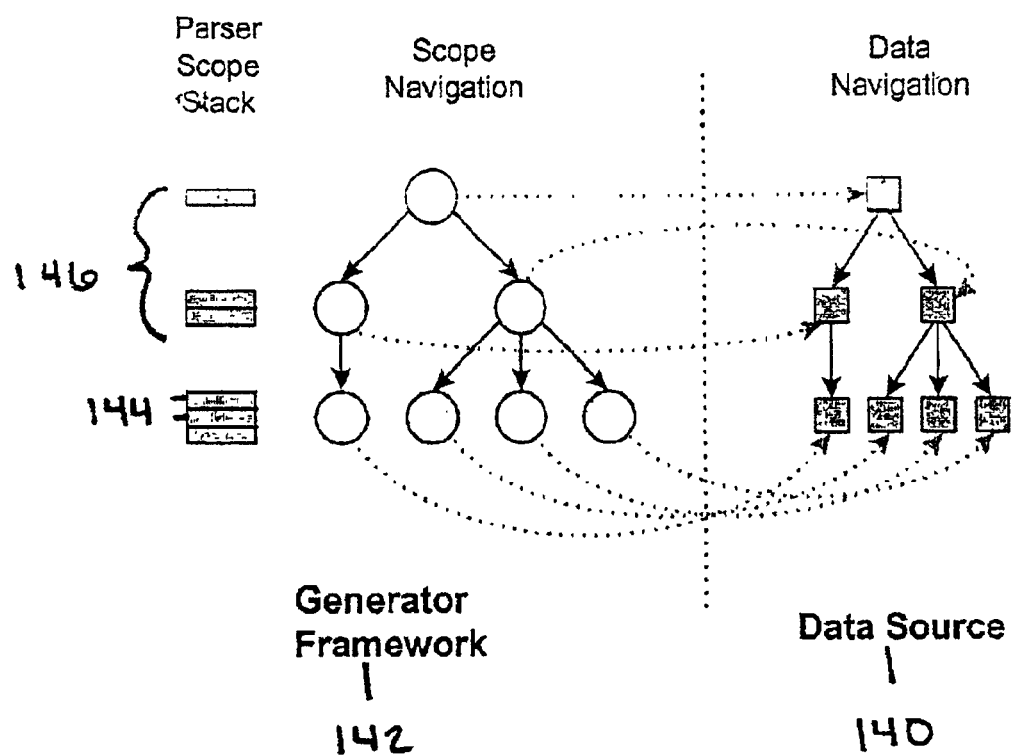
FIG. 2 illustrates how the Generator Framework flexibly maps an abstraction data representation to the source data.

FIG. 2 illustrates how the data navigation layer is used to provide access to the data source 140. The model used for the data source is independent of specific data source implementation. The resultant abstraction 142 provides access to simple type data elements, and navigation inside the data source. Because the model is based on navigation inside the data source, a context must be maintained. This context is referred to herein as a scope 144. The scope provides access to the data sources as a pointer to the current data. Furthermore, the model used in generation is assumed to be a hierarchical assembly 146, so that the scopes are stacked by the parser as abstract tree structures are traversed. The combined scopes act as a "fascade", isolating the parser from the data source implementation.

The Parser 130 provides functions to manipulate the scope stack, such as pushing a new scope on the stack, popping the scope stack, and getting the current scope. The model for the data navigation layer is based on an object-oriented model for data. Scope represents objects from the data source, which have string attributes, accessed through attribute related functions; and references (relationships or pointers to other objects), accessed through reference related functions.

Symbol Naming

A symbol name is a name for an attribute (simple data) or a reference (related scope), and can be absolute or relative. An absolute symbol name is composed of the scope name and the relative symbol name, for example Interface::name. A relative symbol name can be simple or composed. A simple symbol name is just an identifier, such as "srvList". A composed symbol name contains several reference names separated by dots and a simple symbol name used to access a related scope symbols. For instance, getting the module name from the operation scope in the Contract Repository would be done using the following symbol:

interface.module.name

If a module and an interface scopes have been pushed on the scope stack when parsing, the same name can be written:

Module::name

The General form of a symbol name is:

[<ScopeName>::][<ReferenceName>.]*<Name>

Element Cardinality

Attributes and references can be single or multi-valued. This impacts the usage of the Scope API, because it is not semantically possible to query individually an attribute or a reference which is multi-valued. The Scope API defines functions to both query single and multi-valued attributes and references. Single valued attributes and references are queried by functions that return directly the requested value (character string or scope). Multi-valued attributes and references are queried by functions that return an iterator of character strings or scopes. The Scope API provides an isMultiple( ) function that checks if a symbol name corresponds to a single or multi-valued attribute or reference.

Accessing Data Elements

The Scope interface implements a getValue( ) method to get the value of a single-valued attribute. This method accepts a relative symbol name only. If the attribute is multi-valued, this function throws an exception. In the following example, the scope method getValue( ) is used to return the type of a parameter (for example "in", "out" or "inout") in IDL generation:

```
String parameterType =
    currentScope.getValue("paramType");
```

The Scope interface implements a values( ) method that returns an iterator of the values for a multi-valued attribute:

Iterator i=currentScope.values("portNumbers");

Because the scopes are stacked by the parser, the value of a symbol can also be queried to the parser itself, asking the value of the symbol to the top scope on the stack, then to the previous scope, and so on. When querying symbol values from the parser, both absolute and relative symbol names can be used. The parser itself implements a getValue( ) and a values( ) methods, which retrieve directly the corresponding attribute value(s) if the symbol name is absolute; and retrieve the value(s) of the attribute of the current scope (i.e. the scope at the top of the scope stack) if the symbol name is relative.

Scope Navigation

Scope Navigation is performed by means of pointers or pointer-like references. A reference provides access to a list of (sub-)scopes related to the current scope. Similarly to the attribute names, reference names are either relative or absolute. For instance, in IDL generation, a Module scope gives access to an "interface list" reference, which provides access to the interfaces of the module. The relation between the scope navigation and the data source navigation is shown in FIG. 2. The scope method getScope( ) takes a reference name as input and returns the related scope. If the reference is multi-valued, this functions throws an exception. The following shows an example:

```
Scope moduleScope =
    interfaceScope.getScope("module");
```

The scope method scopes ( ) takes a reference name as input and returns an iterator of the corresponding scopes, as shown in the example below:

Iterator i=moduleScope.scopes("interfaces");

Similarly, the parser allows access to references through the scope stack by providing a getScope( ) and scopes( ) methods, accepting both absolute and relative reference names. For instance, this allows access to the module interface list at the operation scope level, by calling:

parser.scopes("Module::interfaceList");

Rules

In the template files, a rule is represented by a string delimited by separators, containing a rule name and zero or more arguments. A rule name is an identifier containing uppercase characters. A rule argument contains text (which may also contain nested rules). In terms of regular expressions, a rule has the following syntax:

$[ruleName[:ruleArgument]*]

The rule delimiter symbols "$[",","]" and ":" may be changed if appropriate. They may even be changeable programmatically. Examples of these are shown below:

```
$ [OPEN:$ [APPNAME] .cpp]
$ [VAL:date:U]
```

Rule Interface

For each rule, there is a piece of code implementing the rule logic. This piece of code is implemented by an execute( ) method which is invoked by the parser. The parser's built-in rules are implemented in the Generator Framework itself. Specific rules are implemented out of the Generator Framework. The Rule interface defines the following abstract method:

```
public abstract String execute(String[] args,
    Parser p) throws GenException;
``` where args are the arguments passed to the rule (arg[0] is the rule name itself). The returned value contains the result of the rule execution, and can then be either printed to the output file or used as an argument to an upper-level rule (see also the OPEN rule example above). If a rule does not generate any output, its return value is null. Rule arguments may contain other rules. It is up to the rule implementation to decide if the arguments should be parsed again. In order to do this, the rule calls the parse( ) method from the parser:

String parse(String str) throws GenException;

Built-in Rules

Built-in rules provide a generic set of rule implementation for data access, data navigation and boolean conditions. These rules are part of the Generator Framework. The (non-exhaustive) list and syntax of these rules is described below in the section titled Built-in Rules Syntax.

Templates

Figure 3:
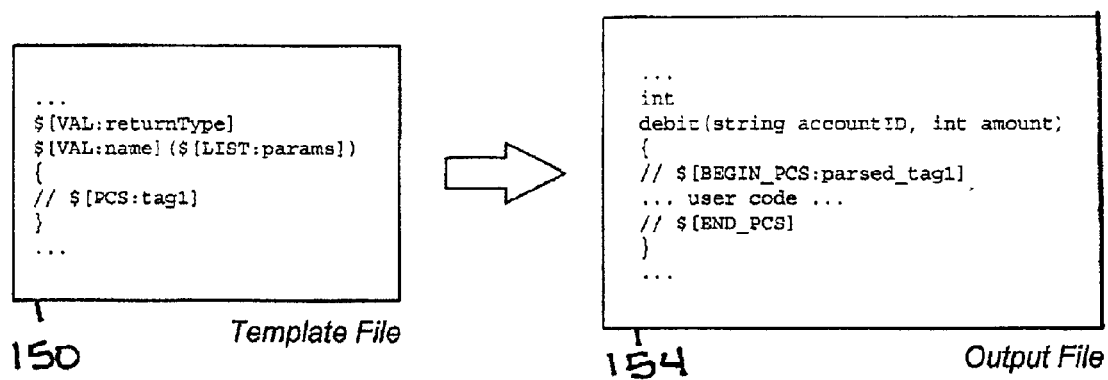
FIG. 3 shows an example of a template file in accordance with an embodiment of the invention.

FIG. 3 shows an example of a template 150 as it may used to generate code 154. Templates are text files that drive the generation process. Template files contain lines of text in which rules are parsed by the generator parser. Template lines also contain static text which is sent directly to the generator output. Some rules (ITERATE, COND) define the notion of a block of template code which is parsed zero or several times depending on some conditions. These blocks of template code are put between the '@{'and'@}' markers. The following is a yacc-like syntax description of the template files. The terminal symbols are in uppercase.

```
TemplateFile: TemplateLines ;
TemplateLines:| TemplateLines TemplateLine ;
TemplateLine: BlockDelimiter RET | TemplateElements
    RET ;
TemplateElements:| TemplateElements TemplateElement;
TemplateElement: Rule | Text;
Rule: '$[' RuleName RuleArgs ']' ;
RuleName: RULE_IDENT;
RuleArgs: | ':' TemplateElements;
Text: TEXT      ;
BlockDelimiter: '@{'| '@}' ;
```

Filters

Filters are used to transform data during the generation. A filter is a piece of logic that takes a string and a scope as input, and outputs the transformed string. Transformation include:

Mapping a name to another name.

Prepending/appending characters.

Changing character case.

Filters are initially registered with the Parser in the framework. Each filter has a name, and may allow several transformations to take place. For example, the "Case" filter (built-in filter) has the two "U" and "L" transformations, for uppercase and lowercase conversion respectively. The Parser provides functions to add and remove filters, and to get a filter by its name.

TextFilter Interface

Text Filters are used to transform any kind of data during the generation process. Text Filters are used by the FILTER rule (see also the FILTER Rule below), and can be used by external rules. The TextFilter interface defines the following abstract method:

```
abstract public String transform(Scope scope,
    String input,
    String transformationName);
```

A filter is invoked from a rule, either built-in (such as the FILTER rule) or specific. The filter name and transformation name are typically arguments to a rule, as shown in the example below:

$[FILTER:$[VAL:moduleName]:Case:U]

SymbolFilter Interface

The SymbolFilter interface is used to transform the value of a symbol. The difference with TextFilters is that a symbol bears more information than simple text from the scope point of view. For instance, the type of the symbol that can be used to transform data includes adding double quotes if the symbol is a string, or generating Y or N if the symbol is boolean. Symbol Filters are used by the VAL rule (see also the VAL Rule below), and can be used by external rules. The SymbolFilter interface defines the following abstract method:

```
abstract public String transform(Scope scope,
    String symbolName,
    String input,
    String transformationName);
```

Using Filters

When implementing Filters, there is the alternative between using:

$[FILTER:$[VAL:symbolName]:filterName:transformationName]

or $[VAL:symbolName:filterName:transformationName]

These two forms are equivalent, unless the symbol name is meaningful to perform the transformation, like the formatting depending on the symbol type above.

Conditions

Conditions are used to generate code conditionally. Conditions are pieces of code that are plugged into the Generator Framework. The Parser provides functions to add and remove conditions, and to get a condition by its name.

Condition Interface

The Condition interface implements the following abstract method:

abstract public boolean isApplicable(Scope scope);

Conditions are used by the COND rule (see COND Rule below), and can be used by external rules.

Generic Conditions

Generic Conditions are implemented by the COND rule. This rule accepts complex conditions as input, expressed by symbol values, constants and logical operators. The condition text is parsed by the COND rule code. The syntax of generic conditions is still an open issue. Below is an example of a generic condition:

```
$[COND:domain.machines.$# > 1]
@{
*NETWORK
$[ITERATE:domain.machines]
@{
$[VAL:lmid] NADDR=$[VAL:naddr] NLSADDR=$[VAL:nlsaddr]
@}
@}
```

In this example, domain.machines is a composed symbol name representing a reference. The $# notation is the number of elements of this reference. Below is a possible syntax for generic conditions, the notation and syntax are borrowed from "The JAVA Language Specification" by the JAVA Team, Addison Wesley, 1996, hereby incorporated by reference.

```
ConditionalExpression:
    ConditionalAndExpression
    ConditionalExpression || ConditionalAndExpression
ConditionalAndExpression:
    EqualityExpression
    ConditionalAndExpression && EqualityExpression
EqualityExpression:
    UnaryExpression
    EqualityExpression RelationalOperator UnaryExpression
RelationalOperator: one of
    == != > < >= <=
UnaryExpression:
    Expression
    ! UnaryExpression
Expression:
    Identifier
    Constant
    ( ConditionalExpression )
Identifier:
    Literal
    Identifier . Literal
    Identifier . $#
Constant:
    NumberConstant
    StringConstant
NumberConstant:
    [-]?[0–9]+
StringConstant:
    " StringChars "
```

Conditional Lists ane Iterations

When navigating the data source with the scopes, it is often desirable to select related data elements depending on some condition. For instance, when generating code from IDL, the list of input parameters may be needed: if the model only provides a list of parameters (in, out, and inout), a conditional list may be useful to do this. This is the purpose of the CONDLIST and CONDITERATE rules, which apply a condition (named or generic) to each scope element of the list or the iteration, and then process their block of template code.

Notifications

Notifiers are used to send messages to external components that use the Generator Framework. Notifiers are typically used to inform external components (such as progress bars, output text widgets) about the status of the generation. A component wanting to be notified about the generation progress must simply implement the Notifier interface (see below). Notifications are sent in rules using the parser notify( ) method. Notifiers are registered in the parser for a specific rule (e.g. OPEN, CLOSE). Two conditions must be met for receiving notification messages from a rule:

The rule must call notify( ) in its execute( ) method.

The notifier must be registered in the parser for that rule.

Notifier Interface

The Notifier interface defines the following abstract method:

```
abstract public void ruleInvoked(String ruleName,
    Parser p,
    String message);
```

Protected Code Sections

Protected code sections allow users of the Generator Framework to define parts of the output file (or files) being untouched by the generation process. This is a powerful mechanism used to preserve user code while still being able to apply the generator to produce updated versions of the output files. For instance, defining a protected code section in a function implementation allows to keep the user code in the output file. Protected code sections are identified by a particular rule in the templates (see also the PCS Rule below). Unicity of a protected code section depends on a tag—which is defined by the person writing the template. The tag generated in the output file is parsed by the PCS rule to ensure uniqueness.

3. Generator Framework

Figure 4:
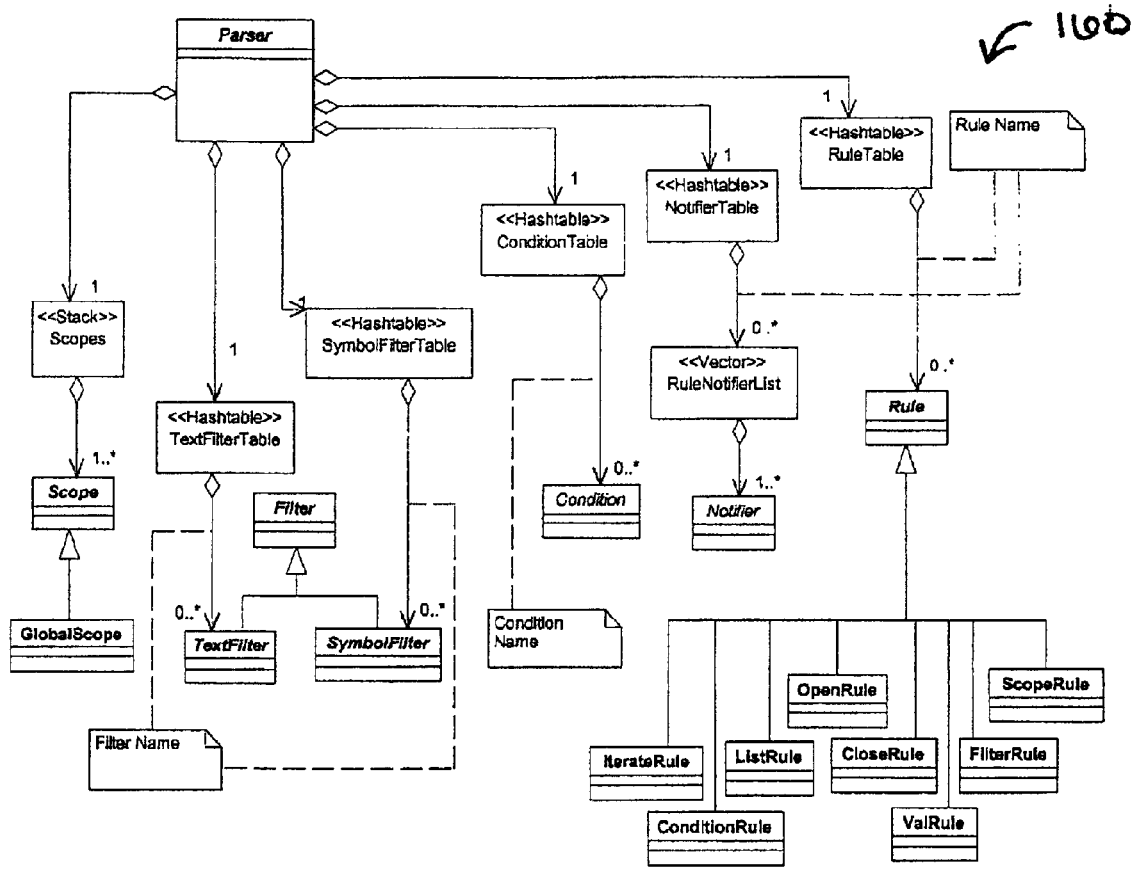
FIG. 4 is a UML diagram of the components of the Generator Framework in accordance with an embodiment of the invention.

The UML diagram in FIG. 4 shows the class architecture of the framework. The meaning of the UML representation 160 in FIG. 4 will be evident to one skill in the art. As shown therein, the parser is the central point of the Generator Framework. It's functions include invoking the parsing of a template file, and executing rules which in turn change the scope of the parser. Scopes are organized in a stack inside the parser. The following class and interface specifications are given as examples, although it will be evident to one skilled in the art that the specific classes given are Scope Class The Scope class is an abstract class providing access to a data source (Contract Repository, Configuration Repository, UREP, . . . ).

```
package com.beasys.generator;
public abstract class Scope {
    //
    // General purpose functions
    //
    public String getName( );
    public String getType(String symbolName);
    public boolean isMultiple(String symbolName);
    //
    // Attribute-related functions
    //
    public abstract boolean hasAttribute(String symbolName);
    public abstract int getAttributeCount(String symbolName);
    public abstract String getValue(String symbolName)
        throws CardinalityException;
    public abstract Enumeration values(String symbolName);
    //
    // Reference related functions
    //
    public abstract boolean hasReference(String symbolName);
    public abstract int getReferenceCount(String symbolName);
    public abstract Scope getScope(String symbolName)
        throws CardinalityException;
    public abstract Enumeration values(String symbol Name);
}
```

Rule Class

The Rule class defines the function that implements a rule. A rule is invoked by the parser when a rule invocation is recognized in the templates.

```
package com.beasys.generator;
public abstract class Rule {
    public String execute(String[] args, Parser p) throws
    GenException;
}
```

Parser Class

The Parser class contains the core of the Generator Framework, parsing template files and invoking rules.

```
package com.beasys.generator;
public class Parser {
    public Parser( );
    //
    // Scope Management
    //
    public Scope getCurrentScope( );
    public String getValue(String symbolName)
    throws CardinalityException;
    public Enumeration values(String symbolName);
    public Scope getScope(String symbolName) throws
    CardinalityException;
    public Enumeration scopes(String symbolName);
    public void popScope( );
    public void pushScope(Scope s);
    //
    // Rule Management
    //
    public void addRule(Rule r);
    public void removeRule(String ruleName);
    //
    // Condition Management
    //
    public void addCondition(String name, Condition c);
    public void removeCondition(String name);
    public Condition getCondition(String name);
    public boolean hasCondition(String name);
    //
    // Filter Management
    //
    public void addFilter(Filter f);
    public void removeFilter(String);
    public Filter getFilter(String name);
    //
    // Notifier Management
    //
    public void addNotifier(String ruleName, Notifier n);
    public void removeNotifier(String ruleName, Notifier);
    public void notify(Rule r, String message);
    //
    // Template Management
    //
    public void loadTemplates(String)
    throws ParserException;
    //
    // Parsing Functions
    //
    public String parse(String s)
    throws GenException;
    public void parseTemplate(String templateName)
    throws GenException;
    //
    // Parser Properties
    //
    public String getOutputDir( );
    public void setOutputDir(String dirName);
    public String getRootDir( );
    public void setRootDir(String dirName);
    public void setTemplateDir(String dirName);
}
```

Filter Class

The Filter class is the common superclass of the SymbolFilter and TextFilter classes:

```
abstract public class Filter
{
protected Filter(String name);
public String getName( );
public abstract boolean hasTransformation(String name);
}
```

SymbolFilter Class

The SymbolFilter class is used by the VAL rule to transform a symbol value.

```
abstract public class SymbolFilter
extends Filter
{
protected SymbolFilter(String);
abstract public String transform(Scope s,
                                 String symbolValue,
                                 String input,
                                 String transfName);
}
```

TextFilter Class

The TextFilter class is used by the FILTER and VAL rules to transform a text value.

```
abstract public class TextFilter
extends Filter
{
protected TextFilter(String);
abstract public String transform(Scope s,
                                 String input,
                                 String transfName);
}
```

Condition Interface

The Condition interface defines a isApplicable( ) method used to conditionally generate code. Conditions are used by the COND rule.

```
public interface Condition
{
public abstract boolean isApplicable(Scope scope);
}
```

Notifier Interface

The Notifier interface defines a method used to notify external components about the status of the generation. External components are notified from rules when the rule invokes the notify( ) method of the Parser class.

```
public interface Notifier
{
public abstract void ruleInvoked(String ruleName,
                                 Parser p,
                                 String message);
}
```

4. Built-in Rules Syntax

The following rules are given as examples of the type of rules that can be used with the invention. It will be evident to one skilled in the art that other rules can be used.

OPEN Rule

Synopsis $[OPEN:<fileName>]

Description

The OPEN rule opens the file <fileName> for output. The generation output is written to the file <fileName>. The name of <fileName> can contain static values such as "test.idl", or symbols for substitution, such as "$[VAL:moduleName].idl".

EXAMPLE $[OPEN:$[VAL:moduleName].idl]

CLOSE Rule

Synopsis $[CLOSE]

Description

The CLOSE rule closes the current output file. The generator output is restored to the previous opened output file, if any. If there is no more output file, any rule other than $[OPEN] causes the generator to fail.

SCOPE Rule

Synopsis $[SCOPE:<scopeName>]

Description

The SCOPE rule ensures that the current scope name is the same as the scope name passed in the rule. The generator fails if the current scope name is not <scopeName>. This rule has no other effect.

VAL Rule

Synopsis

```
$ [VAL:<symbolName>]
$ [VAL:<symbolName>:<filterName>:<transformationName>]
```

Description

The VAL rule is used to return the value of symbols. A symbol value pertains to the current scope stack. Symbol values are retrieved against scopes from the scope stack, using the getValue( ) method of the Scope class. Usually, the VAL rule can only be used on single-valued attributes. An exception is thrown if this rule is used on a multiple-valued attribute. However, the VAL rule can be used with a symbol representing a multi-valued attribute only if it is invoked from an iterated code block in the LIST, ITERATE, CONDLIST and CONDITERATE rules. The second form allows the framework to apply a symbol or a text filter to the symbol value. The <filterName> parameter is the name of the filter to be used. The <transformationName> parameter is the name of a valid transformation in this filter.

EXAMPLE $[VAL:passingMode]$[VAL:type]$[VAL:parameterName:Case:U]

FILTER Rule

Synopsis $[FILTER:<text>:<filterName>:<transformationName>]

Description

The FILTER rule is used to apply a text filter to some text block. The <text> argument is parsed by the parser (it may contain rules). The <filterName> parameter is the name of the text filter to be used. The <transformationName> parameter is the name of a valid transformation in this text filter.

EXAMPLE $[FILTER:$[VAL:parameterType]:FML:outDecl]

COND Rule

Synopsis

```
$ [COND:<condition>:<codeBlock>]
$ [COND:<condition>]
@{
        <conditionalCodeBlock>
@}
```

Description

The COND rule has two forms: the first forms allows to conditionally generate a (one line) piece of code depending on a named or generic condition. The second form allows to generate a block of code (on multiple lines) depending on a named or generic condition. The code block is delimited by the '@{' and '@}' markers.

ITERATE Rule

Synopsis

```
$ [ITERATE:<symbolName>]
@ {
        <iteratedCodeBlock>
@ }
```

Description

The ITERATE rule repeats the same block of code for a given symbol name. The iteration symbol name is a static name corresponding to a multi-valued reference related to the current scope. The iterated code block (between the '@{' and '@}' markers) is a piece of template code that is iterated for all the objects returned by the iteration at the scope level. Rules may be invoked inside this block, with a scope corresponding to the iterated objects. The iteration symbol name can also be a multi-valued attribute. In that case, the iterated code block is invoked with the same scope, and the VAL rule can be used to retrieve the sequenced values of the multi-valued attribute.

LIST Rule

Synopsis

```
$ [LIST:<listName>:<codeBlock>]
$ [LIST:<listName>:<codeBlock>:<Separator>]
```

Description

The LIST rule is similar to the ITERATE rule. Instead of iterating several lines of code, it outputs a list of <codeBlock> elements, separated by a separator string (the default separator is ",").

EXAMPLE $ [VAL:operationName] ($ [LIST:parameterList:$ [VAL:parameterName]])

CONDITERATE Rule

Synopsis

```
$ [CONDITERATE: <symbolName>]
@ {
        <iteratedCodeBlock>
@ }
```

Description

The CONDITERATE rule repeats the same block of code for a given symbol name, depending on a named or generic condition. The iteration symbol name is a static corresponding to a multi-valued reference related to the current scope. The iterated code block (between the '@{' and '@}' markers) is a piece of template code that is iterated for all the objects returned by the iteration at the scope level which satisfy the named or generic condition. Rules may be invoked inside the block, with a scope corresponding to the iterated objects.

CONDLIST Rule

Synopsis

```
$ [CONDLIST:<listName>:<condition>:<CodeBlock>]
$ [CONDLIST:<listName>:<condition>:<codeBlock>:<separator>]
```

Description

The CONDLIST rule is the result of the composition of a LIST rule and a COND rule. Each element generated in the list and used as the current scope in the code block must satisfy the named or generic condition.

EXAMPLE $ [CONDLIST:parameterList:passingMode == "in" :$ [VAL:parameterName]]

INCLUDE Rule

Synopsis $[INCLUDE:<templateName>]

Description

The INCLUDE rule is used to include a template inside the current template.

EXAMPLE $[INCLUDE:t_funcDecl]

PCS Rule

Synopsis $[PCS:<pcs_tag>]

Description

The PCS rule defines the location of a protected code section in a template. The argument to the PCS rule is a tag which is parsed by the parser. In the output file, the protected code section will be delimited by the two lines shown below. Any comments put in the template on the $[PCS: . . . ] line will be preserved in the output file for both begin and end markers.

$[BEGIN_PCS:<parsed_tag>]
$[END_PCS]

5. Template Example

The following example was developed as a prototype for validating the Generator Framework architecture. This particular template example is used to generate IDL files:

```
$ [SCOPE:Module]
$ [OPEN:$ [VAL:name] .idl]

# File: $ [VAL:name] .idl

module $ [VAL:name] {
    $ [ITERATE: interfaceList]
    @{
        interface $[VAL:name] {
            $ [ITERATE:operationList]
            @{
                $ [VAL:retType]
                    $ [VAL:name] ($ [LIST:paramList:$ [VAL:passMode]
$ [VAL:type] $[VAL:name]]);
            @}
        }
    @}
}
$ [CLOSE]
```

In this example, the "name" symbol is used several times to get the names of modules, interfaces, operations, and parameters, respectively. The ITERATE and LIST rules manage the data navigation so that the "name" symbol is each time the name of the element in the corresponding scope.

The foregoing description has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for code generation from a software application design product source data, comprising:
    a data navigation layer that interfaces with, and provides navigational access to, a software application design product source data, wherein said data navigation layer provides navigation inside the source data via a combination of pointers to the source data;
    a template that specifies instructions to drive a code generation process that is applied to said source data;
    a parser that parses said template in accordance with specified rules, filters, and conditions, and accesses the source data via the pointers of the data navigation layer, to generate code, wherein said specified rules implement the template instructions, and wherein said filters are used to transform data; and,
    a code output mechanism that outputs said generated code.

2. The system of claim 1 wherein said code output mechanism outputs said generated code to a storage device.

3. The system of claim 1 further comprising:
    rules that implement template instructions and dynamically generate output.

4. The system of claim 1 further comprising:
    notifiers that include logic applied when a rule is invoked, to allow external components to be notified of progress of the code generation process.

5. The system of claim 1 further comprising:
    condition specifiers that include logic applied when a rule is invoked, to evaluate conditions and allow code generation depending on specific conditions.

6. The system of claim 1 further comprising:
    filters that include logic applied when a rule is invoked, to transform data.

7. The system of claim 1 wherein said system further includes:
    internal rules that provide basic functions to query symbol values from the data source, navigate through the data source, and open and close files.

8. The system of claim 1 wherein said system further includes:
    internal filters that provide generic transformation capabilities, such as lowercase/uppercase conversion.

9. The system of claim 1 wherein said navigation layer allows mapping of an abstracted data representation to said source data.

10. The system of claim 9 wherein said parser provides functions to manipulate a scope stack, wherein said scope stack addresses said abstracted data representation.

11. The system of claim 10 wherein said parser creates a hierarchical scope stack.

12. The system of claim 10 wherein navigation within said scope stack is by a pointer.

13. A method of generating computer code, comprising the steps of:
    providing a data navigation layer to interface with, and to provide navigational access to, a software application design product source data, wherein said data navigation layer provides navigation inside the source data via a combination of pointers to the source data;
    providing a template to specify instructions to drive a code generation process that is applied to said source data;
    parsing said template using a parser in accordance with specified rules, filters, and conditions, and accessing the source data via the pointers of the data navigation layer, to generate code, wherein said specified rules implement the template instructions, and wherein said filters are used to transform data; and,
    outputting, via a code output mechanism, said generated code.

14. The method of claim 13 wherein said step of outputting includes outputting said generated code to a storage device.

15. The method of claim 13 further comprising:
    parsing rules that implement template instructions and dynamically generate output.

16. The method of claim 15 further comprising:
    parsing notifies that include logic applied when a rule is invoked, to allow external components to be notified of progress of the code generation process.

17. The method of claim 15 further comprising:
    parsing condition specifiers that include logic applied when a rule is invoked, to evaluate conditions and allow code generation depending on specific conditions.

18. The method of claim 15 further comprising:
    parsing filters that include logic applied when a rules is invoked, to transform data.

19. The method of claim 13 further comprising the step of:
    parsing internal rules that provide basic functions to query symbol values from the data source, navigate through the data source, and open and close files.

20. The method of claim 13 further comprising the step of:

parsing internal filters that provide generic transformation capabilities, such as lowercase/uppercase conversion.

21. The method of claim 13 wherein said navigation layer maps an abstracted data representation to said source data.

22. The method of claim 21 wherein said parser provides functions to manipulate a scope stack, wherein said scope stack addresses said abstracted data representation.

23. The method of claim 22 wherein said parser creates a hierarchical scope stack.

24. The method of claim 22 further comprising the step of:

navigating within said scope stack using a pointer.

25. A system for code generation, comprising:

a data navigation layer to interface with, and for providing navigational access to, a software application design product source data, said navigation layer allows mapping of an abstracted data representation to said source data;

a template to specify instructions to drive a code generation process that is applied to said source data;

a parser to parse said template in accordance with any specified rules, filters, conditions, and notifiers, and accessing the source data via the data navigation layer, to generate code, said parser provides functions to manipulate a scope stack, wherein said scope stack addresses said abstracted data representation, said parser creates a hierarchical scope stack, navigation within said scope stack is by a pointer;

rules that implement template instructions and dynamically generate output;

notifiers that include logic applied when a rule is invoked, to allow external components to be notified of the progress of the code generation process;

condition specifiers that include logic applied when a rule is invoked, to evaluate conditions and allow code generation depending on specific conditions; and, filters that include logic applied when a rule is invoked, to transform data.

26. A system according to claim 1, wherein said rules, filters and conditions are registered as plug-ins to said parser.

27. A method according to claim 13, wherein said rules, filters and conditions are registered as plug-ins to said parser.

* * * * *